United States Patent [19]

Yokoyama

[11] Patent Number: 4,484,549
[45] Date of Patent: Nov. 27, 1984

[54] 4-CYCLE INTERNAL COMBUSTION ENGINE

[75] Inventor: Hiroshi Yokoyama, Hamamatsu, Japan

[73] Assignee: Suzuki Jidosha Kogyo Kabushiki Kaisha, Japan

[21] Appl. No.: 209,108

[22] Filed: Nov. 21, 1980

[30] Foreign Application Priority Data

Jan. 9, 1980 [JP] Japan ................................. 55-1151

[51] Int. Cl.³ ........................................... F02B 31/00
[52] U.S. Cl. .............................. 123/308; 123/188 M; 123/52 M
[58] Field of Search ................. 123/308, 432, 188 M, 123/52 M

[56] References Cited

U.S. PATENT DOCUMENTS

| 1,799,397 | 2/1931 | Taylor et al. |
| 3,087,480 | 4/1963 | Baudry. |
| 3,364,911 | 1/1968 | Baudry. |
| 4,117,808 | 10/1978 | Takamiya ............................ 123/432 |
| 4,167,161 | 9/1979 | Nakagami ........................... 123/308 |
| 4,271,802 | 6/1981 | Hori et al. ............................ 123/432 |

FOREIGN PATENT DOCUMENTS

| 157602 | 5/1970 | Fed. Rep. of Germany. |
| 2387358 | 10/1978 | France. |
| 59110 | 5/1978 | Japan. |
| 54-13807 | 2/1979 | Japan. |
| 55222 | 5/1979 | Japan. |
| 54-67823 | 5/1979 | Japan. |
| 103913 | 8/1979 | Japan ................................. 123/308 |
| 495865 | 2/1937 | United Kingdom. |

Primary Examiner—Parshotam S. Lall
Assistant Examiner—W. R. Wolfe
Attorney, Agent, or Firm—Quaintance & Murphy

[57] ABSTRACT

An internal combustion engine equipped with a sub-suction path to produce a swirl of suction in the combustion chamber, characterized in that there are two inlets to the sub-suction path, one of the inlets opening into the atmosphere side after bypassing the throttle valve of the carburetor to the venturi and the other being operable by the throttle valve of the carburetor and opening in the duct of the carburetor so that it can be closed by the throttle valve at idling. In this arrangement of the engine, the fuel consumption can be saved; a misfiring can be prevented; an untimely or delayed injection of fuel from the main fuel nozzle in low to high load operation can be averted; and a stable combustion can be assured in medium load operation in which a particularly heavy EGR takes place.

6 Claims, 5 Drawing Figures

4-CYCLE INTERNAL COMBUSTION ENGINE

BACKGROUND OF THE INVENTION

1. Field of the Invention

The present invention relates to an internal combustion engine equipped with a sub-suction path to produce a swirl of suction gas in the combustion chamber, more specifically to a 4-cycle internal combustion engine in which the number of inlets to the sub-suction path and their opening positions are selected such that in the medium-load driving range where EGR (exhaust gas recirculation) is particularly active, a stable combustion is assured with an untimely supply of fuel being prevented; and fuel consumption can be reduced.

2. Description of the Prior Art

The latest requirements with auto internal combustion engines are exhaust gas purification, substantial reduction of $NO_x$ in particular and better fuel economy. For this purpose, EGR and lean combustion are often adopted. In this connection it has been well-known that the burning speed has only to be raised to avoid fluctuations in burning or misfiring while meeting the requirements of both much EGR and lean combustion.

Several proposals have been made to provide a sub-suction path separately from the main suction path so that the sub-suction path may serve to suck the gas and inject it into the combustion chamber, thereby producing a swirl of the suction gas in the combustion chamber, for the purpose of raising the burning speed.

The suction system having the proposed sub-suction path, however, is still in the stage of being developed to practical application and leaves much to be studied hereafter. As a matter of fact, the location of the inlet to such a sub-suction path in the conventional internal combustion engine has been inproper and caused various inconveniences depending on the mode of operation. In the conventional engine there is only one inlet to the sub-suction path and this inlet is located either closer to the atmosphere side than the carburetor venturi or within the carburetor duct between the carburetor venturi and the throttle valve. In the former location, the volume of the air passing through the carburetor venturi where the main fuel nozzle opens is naturally less and in consequence an untimely or delayed supply of fuel from the main fuel nozzle takes place especially in the medium or high load operation, and the engine response to the accel pedal action becomes poor. Further, if the opening area of the inlet is designed to match the necessary volume of gas to be injected from the sub-suction path for the medium load operation with much EGR, in time of idling a relatively large amount of the air will be supplied from the sub-suction path in spite of the small amount of the fuel supplied from the carburetor, which will result in an extremely high A/F ratio and accordingly a high possibility of misfiring.

In the latter location, the whole air flowing into the sub-suction path will be introduced through the carburetor venturi, but on account of the throttling effect of the venturi, the necessary volume of suction gas coming from the sub-suction path for the medium load operation will diminish, failing to cause a sufficient swirl. Meanwhile, in time of idling, the air passing through the venturi will suck up the fuel out of the main fuel nozzle and in consequence an excessive fuel in addition to the mixed gas from the idle port will come from the main fuel nozzle, which is unfavourable for fuel economy.

SUMMARY OF THE INVENTION

The primary object of the present invention is therefore to provide a 4-cycle internal combustion engine free from all the drawbacks described above.

Another object of the present invention is to provide such a 4-cycle internal combustion that uses the conventional carburetor virtually as it is, with no major design change and no addition of members.

These objects of the present invention can be attained by providing at least two inlets to the sub-suction path, one inlet opening into the atmosphere side after bypassing of the throttle valve in the carburetor and the venturi of the carburetor and the other inlet opening into the carburetor duct such that it can be opened or closed by the carburetor throttle valve, it being closed by the throttle valve at idling.

These and other objects and features of the invention will become apparent to those skilled in the art as the disclosure is made in the following description of a preferred embodiment of the invention, as illustrated in the accompanying sheets of drawings.

DETAILED DESCRIPTION OF A PREFERRED EMBODIMENT

Figure 1:
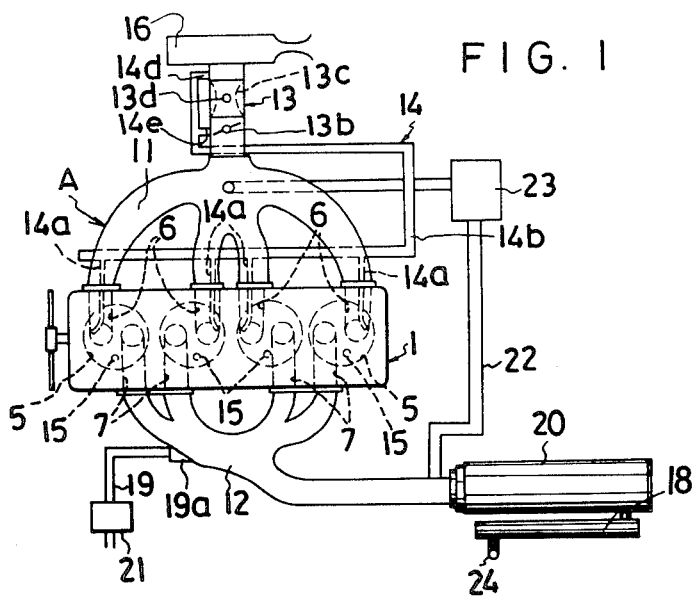
FIG. 1 is a schematic diagram showing one embodiment according to the present invention.
Figure 2:
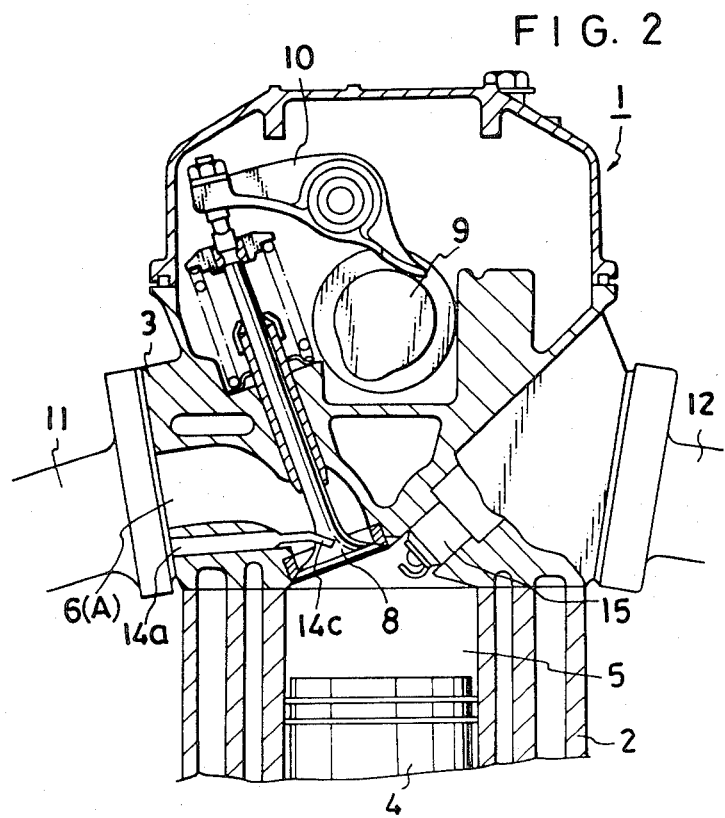
FIG. 2 is a longitudinal section view of one part of the embodiment in FIG. 1.

In FIGS. 1 and 2, 1 denotes a 4-cycle series 4-cylinder engine assembly, which comprises as usual a cylinder 2, a cylinder head 3 mounted on the cylinder 2 and a piston 4 slidable into the cylinder 2. In the four combustion chambers 5 bounded by these elements 2, 3 and 4 there open a suction port 6 and an exhaust port 7 formed in each cylinder head 3. The two ports 6 and 7 can be opened or closed by means of a suction valve and an exhaust valve (not shown). The action of the suction valve 8 is controlled by a suction valve control device consisting of a cam 9, a rocker-arm 10, etc. The action of the exhaust valve is controlled by a similar mechanism.

Figure 3:
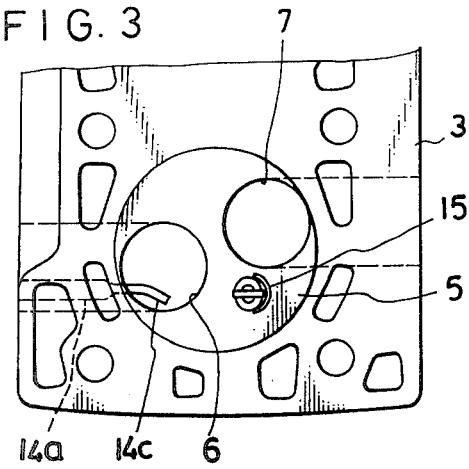
FIG. 3 is an view of a cylinder head as viewed from the underside, i.e., the one part of the embodiment illustrated in FIG. 1.

The suction port 6 is connected to a suction manifold 11, while the exhaust port 7 is connected to an exhaust manifold 12. The suction manifold 11 is connected at its branch-off to a carburetor 13 and thereby the suction port 6 and the suction manifold 11 constitute a main suction path A communicating the carburetor 13 to the combustion chamber 5. As indicated in FIG. 3, the suction port 6 is directed near-tangentially toward the inside wall of the combustion chamber 5 (cylinder 2), so that the mixed gas supplied therefrom can cause a swirl around the axis of the cylinder 2 within the combustion chamber 5. The swirl is directed such that it first scavenges the spark plug 15 and then moves toward the exhaust port 7. The suction port 6 is not given any extreme directionality lest the volume efficiency should drop under high load.

Figure 4:
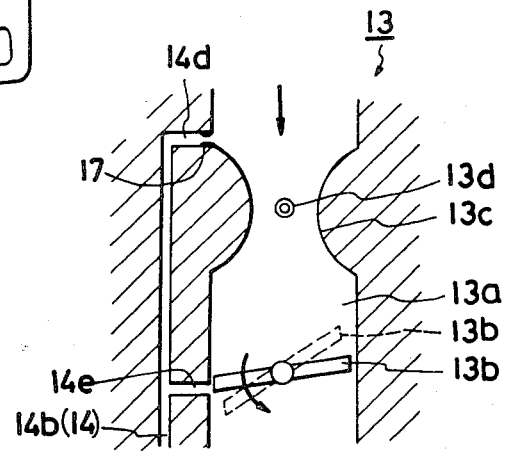
FIG. 4 is a sectional view of a principal portion in the embodiment of FIG. 1, i.e., the portion including the carburetor.

Each combustion chamber 5 is supplied (by suction) with the gas from a sub-suction or supplemental path 14 as well as with the mixed gas from the main suction path A. The sub-suction path 14 comprises four branches 14a, i.e., as many as the cylinders provided and one confluent path 14b of a larger diameter to which these branches 14a communicate; and the effective open area of the path 14b is made sufficiently smaller than that of the main suction path A. As indicated in FIG. 2 the tip of each branch 14a, i.e., the outlet of the sub-suction path 14 is designed as a jet nozzle 14c of smaller diameter, which opens just upstream of the suction valve 8 in a tangential or chordwise direction, as indicated in FIG. 3, to the combustion chamber 5 (i.e., the side wall of this chamber, or the inner wall of the cylinder 2). Therefore, when the gas is injected (sucked) into the combustion chamber 5 from the jet nozzle 14c, a swirl will be developed therein around the axis of the cylinder 2, the swirl being directed in the same swirling direction of the mixed gas from the main suction path A. An inlet portion to the sub-suction path 14, i.e., the end of the confluent path 14b splits into two branches. Namely first and second inlets 14d and 14e open into a duct 13a of the carburetor 13. As seen from FIG. 4, the inlets 14d and 14e are spaced from each other in the flow direction of the duct 13a, the first one 14d located upstream bypassing the throttle valve 13b of the carburetor 13 and a main fuel nozzle 13d which opens into a venturi 13c and thus opening upstream (of course, downstream of an air cleaner 16) of the venturi 13c; and the second one 14e being located such that it can be opened or closed by the throttle valve 13b, more specifically located such that it can be closed by the throttle valve 13b at idling position, (the valve-closing position indicated by a solid line in FIG. 4) and it finds itself upstream of the throttle valve 13b when the throttle valve 13b is open (as indicated by a broken line in FIG. 3). The first inlet 14d is provided with a jet 17 to regulate the volume of the gas (air) to be sucked in.

Meanwhile an exhaust piping which leads to a muffler 18 via a manifold 12 from the exhaust port 7 is connected with a secondary air intake pipe 19, while an oxidizing catalyst 20 is installed downstream of a secondary air intake 19a. A secondary air supply device 21 is connected to the secondary air intake pipe 19 and this device consists of a read valve operated by the pulsating pressure of the exhaust gas or a secondary air supply pump as conventionally used. From the exhaust piping branches out an EGR pipe 22 between the two elements 19a and 20, the end of the EGR pipe 22 being connected to a junction of the suction manifold 11 downstream of the carburetor 13. Further, the EGR pipe 22 is equipped with an EGR valve 23 which controls the volume of EGR. The oxidizing catalyst 20 can be a conventional one, and the EGR valve can be a conventional one of, say, negative pressure acting type utilizing the negative pressure of suction pipe. In FIG. 1, 24 denotes an exhaust opening.

Next the function under the above arrangement is to be described. A negative pressure generated in the combustion chamber 5 in the suction stroke of the engine operation causes a mixed gas formed in the carburetor 13 to be supplied (sucked) via the main suction path A into the combustion chamber 5 and at the same time causes a gas (air or mixed gas) to be sucked and injected via the sub-suction path 14 into the combustion chamber. Then the gas injection through the sub-suction path 14 produces a swirl of the suction gas around the axis of the cylinder 2 within the combustion chamber 5, thereby promoting the homogeneity of the mixed gas and increasing the burning speed. It goes without saying that the suction into the combustion chamber 5 through both the suction paths A and 14 is well timed with the action of the suction valve 8.

Figure 5:
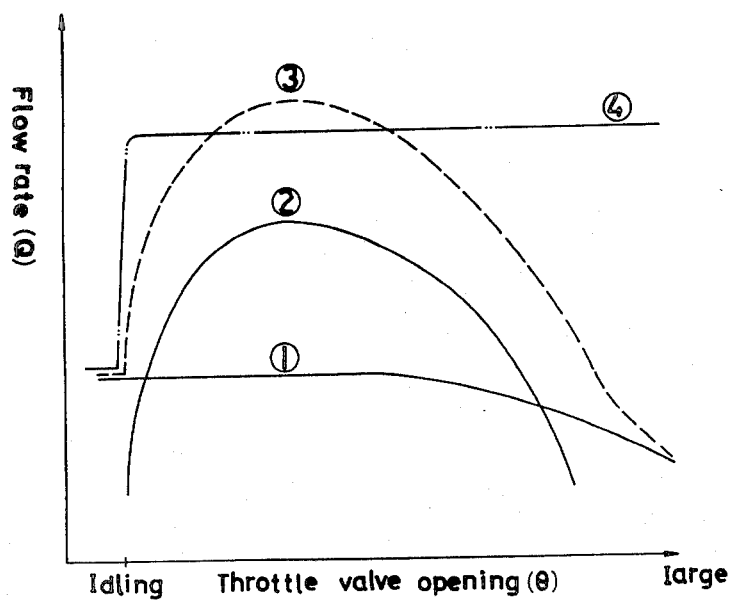
FIG. 5 is a diagram illustrating the relation between the opening degree of the throttle valve and the volume of gas flow out of the sub-suction path.

In FIG. 5 is illustrated the relationship between the volume of gas injected into the combustion chamber 5 via the sub-suction path 14 and the opening degree of the throttle valve 13b, ① in the figure denoting the sucked volume of gas through the first inlet 14d, ② denoting the sucked volume of gas through the second inlet 14e, ③ denoting the total sucked volume of the gases through both inlets 14d and 14e and ④ denoting the lower limit of the desirable gas injection from the sub-suction path 14 in the medium load operation of engine.

Now referring to FIG. 5, the performance of the engine according to the present invention will be described for different loads on the engine (for different opening degrees of the throttle valve 13b).

(i) Idling

In time of idling with the second inlet 14e of the sub-suction path 14 being closed by the throttle valve 13b, the gas (air) is admitted into the sub-suction path 14 through the first inlet 14d alone. Thus with the throttle valve 13b closed and accordingly the second inlet 14e closed, no air is allowed to pass through the venturi 13c and in consequence with no fuel delivered from the fuel nozzle 13d to the duct 13a, there is no leak of excess fuel, resulting in better fuel economy. In time of idling the gas injection into the combustion chamber 5 from the sub-suction path 14 is relatively little and only a small volume of mixed gas is supplied via an idle port (not shown) from the carburetor 13, so a misfiring can be avoided by suppressing the injection volume of the gas via the sub-suction path.

(ii) Low to high load operation

In low to high load operation, both the inlets 14d and 14e are open and in the sub-suction path—particularly in medium load operation with a heavy EGR—a large volume of gas is sucked in and as the result the gas injection from the sub-suction path 14 into the combustion chamber 5 is intensified, thereby strengthening the swirl of suction in the combustion chamber 5. Thus a stable combustion takes place in the medium load operation with a heavy EGR. Naturally, most of the air to be sucked into the combustion chamber 5 in low to high load operation goes through the venturi 13c and therefore an untimely or delayed injection of fuel from the fuel nozzle 13d cannot happen. In high load operation the gas injection from the sub-suction path 14 into the combustion chamber 5 is lessened. The reason is that no strong swirl of suction is needed, because under high load a particularly high output should be developed and accordingly EGR is not made so heavily; moreover the residual gas in the combustion chamber 5 (gas which remains after combustion without being discharged) is not much.

In the above example described, it would be possible to adjust the gases sucked in through the first inlet 14d and the second inlet 14e to desired proportions by varying the open diameters of the inlets. Thereby if just as in the illustrated example a jet 17 were provided at the first inlet 14d, the volume of gas introduced through 14d would be kept nearly constant regardless of the opening degree of the throttle valve 13b and thus it would become easy to desirably regulate the gas injection from the sub-suction path 14 in accordance with the opening degree of the throttle valve 13b. The volume of air sucked in through the first inlet 14d can be set at the necessary volume for idling.

When the first inlet 14d is arranged such that it opens into the atmosphere side after bypassing the throttle valve 13b of the carburetor 13 to the fuel nozzle 13d, it makes no difference wherever the opening position of the inlet is located. The carburetor can be a two-barrel type or a variable venturi (SU type). If it is a two-barrel one, the second inlet 14e of the sub-suction path has only to be located against the throttle valve on the primary side.

I claim:

1. In a four-cycle internal combustion engine, wherein the engine includes a plurality of cylinders in each of which reciprocates and each of which includes a cylinder head having intake and exhaust valves, the inlet valves being connected to the downstream end of a main air inlet passage which passage has formed at its upstream end a carburetor, the carburetor having a venturi with a fuel inlet and a butterfly valve with the flap thereof located downstream of the venturi and fuel inlet for movement between an open and closed position, the improvement characterized by:

a path having only two inlet openings, wherein a first one of the inlet openings has a throttle throat restriction therein and opens to the inlet passage at a position upstream of the venturi and butterfly valve, whereby the amount of air entering the supplemental path is independent of the position of the flap of the butterfly valve; a second one of the inlet openings opens to the inlet passage at a fixed position which is in alignment with the flap of the butterfly valve when the flap is closed which fixed position is upstream of the flap when the flap is open, wherein the flap of the butterfly valve interrupts air and fuel flow into the second one of the inlet openings when the flap is closed and allows air and fuel to flow into the second one of the inlet openings when the flap is open; the supplemental path including a manifold in series therewith and an individual outlet line connecting the manifold to each cylinder, wherein each outlet line opens in a direction which extends chordwise with respect to the respective cylinder to enhance swirling motion of the air and fuel ejected; whereby when the butterfly valve is closed during idling, air is introduced only into the first one of the inlet openings and fuel introduction into the supplemental air line is blocked, and when the butterfly valve is open during load operation of the engine, fuel and air are sucked into the second one of the inlet openings for subsequent ejection through the outlet openings.

2. In a four-cycle internal combustion engine, wherein the engine includes at least one cylinder in which a piston reciprocates and a cylinder head having air intake and exhaust valves, the air intake valve being connected to a downstream end of a main air inlet passage which passage has formed at its upstream end a carburetor, the carburetor having a venturi with a fuel inlet and a throttle valve with flat thereof positioned downstream of the venturi and fuel inlet, the improvement characterized by:

a sub-suction path having a diameter substantially smaller than the main air inlet passage, said sub-suction path having an outlet which opens just upstream of the air intake valve in a tangential direction to an inner wall of the cylinder, said outlet comprising a jet nozzle having a smaller diameter than the sub-suction path; and said sub-suction path having two inlets, a first inlet and a second inlet, said first inlet opening into the carburetor at a position immediately upstream of the venturi and said first inlet having a restriction therein for controlling the amount of air passing therethrough, and said second inlet opening into the carburetor at a position such that said second inlet is in alignment with the flap of the throttle valve when the throttle is closed and is upstream of the flap when the throttle valve is open;

wherein, an amount of air passes into said sub-section path through said first inlet, the amount of air passing therethrough being independent of the position of the throttle valve; and wherein, said second inlet is closed when said throttle valve is closed, said throttle valve being closed during idling, and said second inlet is open when said throttle valve is open; and wherein, air and fuel flow through said second inlet into the sub-suction path when said second inlet is open, and wherein the flow of air and fuel through said second inlet into the sub-suction path is interrupted when said second inlet is closed.

3. In a four-cycle internal combustion engine, wherein the engine includes at least one cylinder in which a piston reciprocates and a cylinder head having intake and exhaust valves, the inlet valve being connected to the downstream end of a main air inlet passage which passage has formed at its upstream end a carburetor, the carburetor having a venturi with a fuel inlet and a butterfly valve with the flap thereof positioned downstream of the venturi and fuel inlet, the improvement characterized by:

a supplemental path for intake air, the supplemental path having a diameter substantially less than that of either the air intake valve or main air inlet passage, the supplemental path having an outlet opening just upstream of the air intake valve and only two inlet openings, wherein one of the inlet openings is unobstructed and connects the supplemental path to the main air inlet passage at a position upstream of the venturi and the other one of the inlet openings is located at a position in alignment with the flap of the butterfly valve when the flap is closed and downstream of the flap when the flap is open, the flap of the butterfly valve interrupting air and fuel flow into the other inlet opening when the flap is closed and allowing air and fuel to flow into the other inlet opening when the flap is open; whereby when the butterfly valve is closed during idling air is introduced only into said one inlet opening and fuel introduction into the supplemental air line is blocked, and when the butterfly valve is open during load operation of the engine, fuel and air are sucked into said other inlet opening for subsequent ejection through the outlet opening at the downstream end of the supplemental air intake path.

4. The improvement of claim 3 wherein the first inlet has a restriction therein for controlling the amount of inlet air passing therethrough whereby the amount of air entering the supplemental path is independent of the opening of the butterfly valve.

5. The improvement of claim 3 wherein the outlet opening of the supplemental path is directed chordwise with respect to the intake valve to enhance swirling motion of the ejected air and fuel.

6. The improvement of claim 5 wherein there are a plurality of cylinders in the engine and wherein the supplemental path for intake air includes a manifold having an outlet opening for each cylinder and a single line connected to the first and second inlets.

* * * * *